Dec. 22, 1942.    E. R. BACKUS    2,305,595
UNIVERSAL COUPLING
Filed Dec. 12, 1941    2 Sheets-Sheet 1

INVENTOR
EARL R. BACKUS
by John E. Jackson
his Attorney

Dec. 22, 1942.    E. R. BACKUS    2,305,595
UNIVERSAL COUPLING
Filed Dec. 12, 1941    2 Sheets-Sheet 2
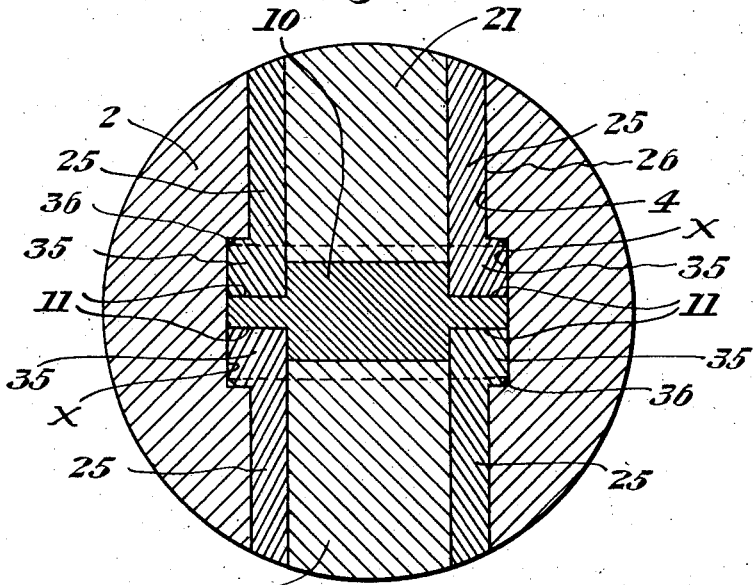
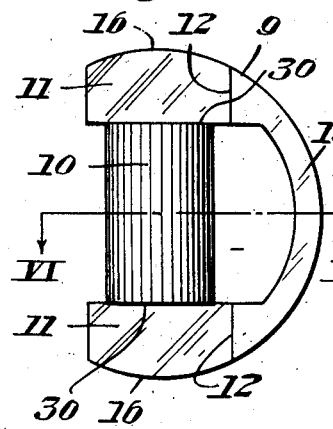
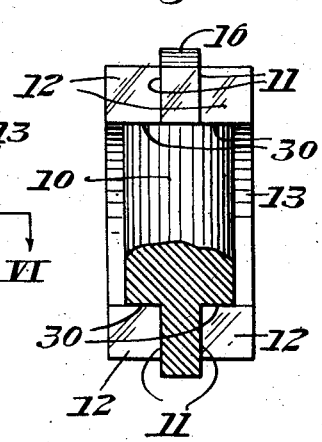
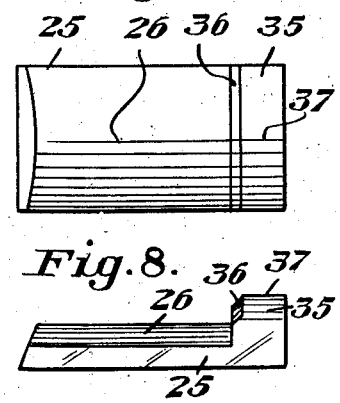
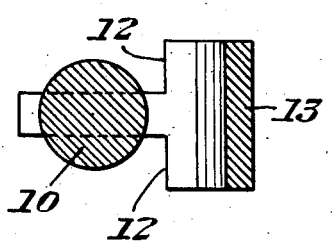
INVENTOR
EARL R. BACKUS
by John E. Jackson
his Attorney Patented Dec. 22, 1942

2,305,595

UNITED STATES PATENT OFFICE 2,305,595

UNIVERSAL COUPLING

Earl R. Backus, Glassport, Pa.

Application December 12, 1941, Serial No. 422,737

9 Claims. (Cl. 64—7)

This invention relates to universal couplings, and more particularly to such universal couplings as are used in steel mills for connecting rolling mill rolls with driving means, although not limited thereto.

In numerous heavy duty driving installations, and particularly those used in rolling mills, considerable difficulty is encountered in satisfactorily transmitting torque to a driven element which cannot be maintained in line with the driving element due to operating factors such as adjustments for gauge. There has come into wide usage a coupling which makes use of bearing shoes or "slippers" of bronze or composition material which are placed between the two principal parts of coupling. These bearing "slippers" take the form of elongated one-piece members, and are used in spaced pairs. Because of their elongated one-piece construction, these shoes are easily damaged in assembly, and are thus rendered useless. In addition, these elongated one-piece segments are not flexible and give rise to rapid wear on the surfaces of the coupling elements. When operated in only one direction of rotation, as is frequently the case, wear occurs at two diametrically opposite points of the coupling. This means that the elongated one-piece bearing shoes of the prior art must be replaced, although worn only at two diametrically opposite points, as otherwise the proper size cannot be maintained.

It is among the primary objectives of the present invention to provide a heavy duty universal coupling which will permit substantial departure from alignment of the axes of the coupled elements and one which at the same time may be rapidly assembled or disassembled.

Another object is the provision of a device having the foregoing advantages and one which is at the same time capable of withstanding extreme abuse.

Still another object is to provide a universal coupling of the type described which permits of closer clearances, resulting in better operating conditions and longer life.

A further object is to provide increased bearing areas together with increased self-alignment of the parts, even though the faces of the coupling elements are worn. This relieves strain on any of the parts.

A still further object is to provide a universal coupling which permits of reclaiming most of the coupling elements upon damage to certain of the other parts thereof.

The invention, then, comprises the features hereinafter fully described and as particularly pointed out in the claims, the following description and the annexed drawings setting forth in detail a certain illustrative embodiment of the invention, this being indicative of one of the number of ways in which the principles of the invention may be employed.

In said drawings:

Figure 3 is a sectional view on the line III—III of Figure 2.

Figure 4 is an elevation of a pivotal element of the coupling.

Figure 5 is a view similar to Figure 4 but taken at right angles thereto and shown partly in section.

Figure 6 is a sectional view on the line VI—VI of Figure 4.

Figure 7 is a plan of one of the bearing shoes of the coupling.

Figures 8 and 9 are, respectively, a side elevation and end elevation of the bearing shoe of Figure 7.

Figure 1:
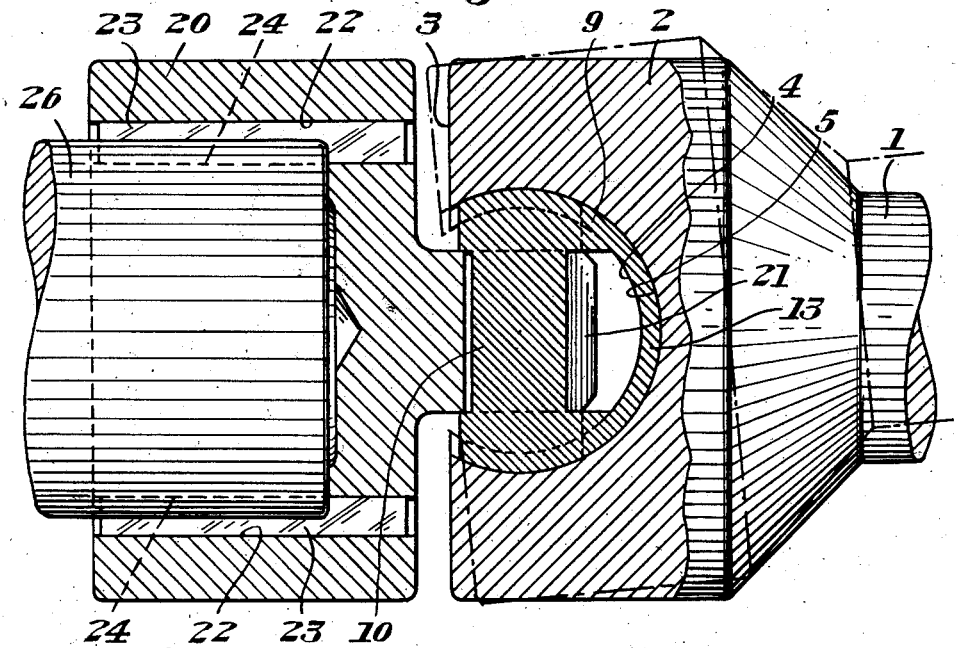
Figure 1 is a longitudinal view, partly sectional and partly elevational, of the coupling of the present invention.
Figure 2:
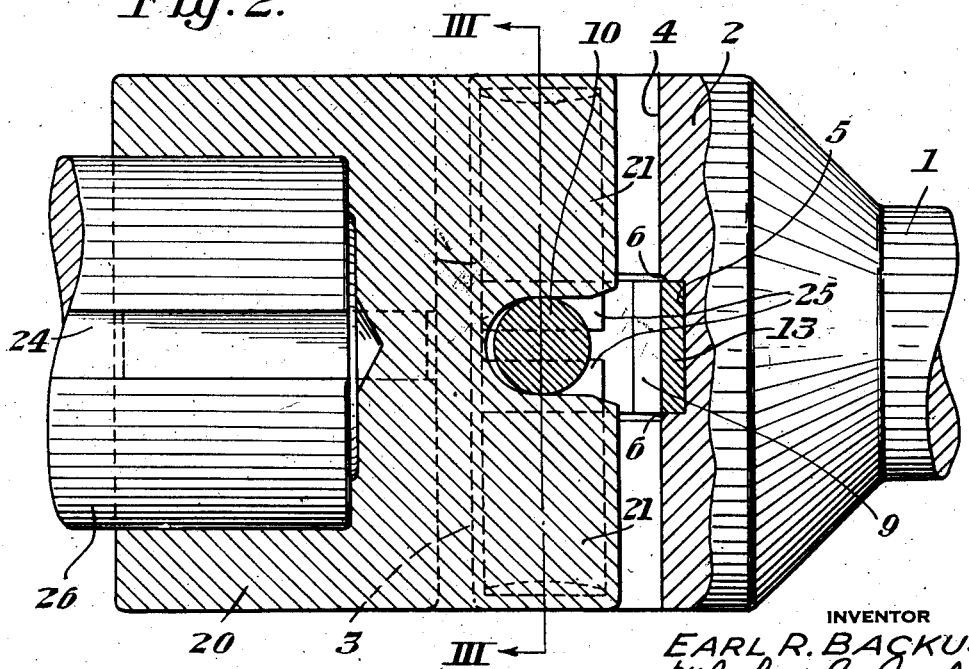
Figure 2 is a view similar to Figure 1 but taken at right angles thereto.

Referring more particularly to the drawings, the numeral 1 designates a power-driven spindle having integrally formed on the end thereof an enlarged head 2 providing a flat outer end 3 having a continuous semi-circular groove 4 extending entirely across it. Midway of the continuous semi-circular groove 4 and extending at right angles thereto is a continuous recess 5 which is shown as being rectangular in section. Along its edges which communicate with the continuous semi-circular groove 4, the continuous right-angularly-extending recess 5 is relieved with a bevel 6.

Referring more particularly to Figure 4, the flexible coupling of the present invention comprises a one-piece unit generally designated at 9. More specifically, this back-up unit 9 comprises a cylindrical stud or pivotal element 10 having its ends flattened on both sides as shown at 11.

The flattened ends 11 of the cylindrical stud or pivotal element 10 are connected to, or formed integrally with, the squared ends 12 of a semi-circular arbor 13 which is rectangular in cross section. This construction provides squared surfaces forming a T-shaped tongue at each end of the cylindrical stud 10. The outer extremities of the flattened ends 11 of the cylindrical stud 10 are curved, as at 16, in conformity with the arc of the outer face of the semi-cylindrical arbor 13.

According to the foregoing construction and arrangement, it will be perceived that the back-up unit 9 may be made to occupy the continuous right-angular recess 5 in the mid-portion of the continuous semi-circular groove 4 by way of being inserted endwise in the said groove and rotated at approximately 90° into progressive occupancy of the outer face of the semi-cylindrical groove in the said recess 5. For this purpose the radius of curvature of the curved outer face of the semi-circular arbor 13 and the curved outer extremities 16 of the flattened ends 11 of the cylindrical stud 10 is made to substantially correspond with the radius of curvature of the recess 5.

The driven element of the flexible coupling of the present invention comprises a sleeve 20 having integrally formed at one end thereof a flattened lug 21 which is adapted to extend into the continuous semi-circular groove 4 in the outer face 3 of the head 2 of the power-driven spindle 1. The center portion of the lug 21 is slotted in order to closely embrace the opposite sides of the cylindrical stud 10 which forms part of the back-up unit 9. This sleeve 20 is provided on its inner face with a series of splines 22 which, through the medium of keys 23, are connected with similar splines 24 on the end of the roll neck 26 or other instrumentality to be driven.

From the foregoing it will be perceived that due to the ability of the semi-circular arbor 13 of the back-up unit 9 to partially rotate in the right-angular recess 5 in the continuous semi-circular groove 4 of the driving spindle 1, and the freedom of the sleeve 20 to swing at right angles to the cylindrical stud 10, there is provided a universal movement.

The teachings of the present invention comprise the provision of replaceable elongated bearing shoes 25 which contact the opposed cylindrical surfaces provided by the continuous semi-circular groove 4 and also the adjacently disposed flattened surfaces of the lug 21 of the sleeve 20. For this purpose, the outer faces of the replaceable bearing shoes 25 are transversely curved as at 26, the radius of curvature substantially corresponding to the radius of curvature of the cylindrical surfaces of the semi-circular groove 4. The opposite surfaces of the replaceable elongated bearing shoes 25 are flat, in order to seat on the flattened surfaces of the flattened lug 21.

The foregoing construction permits of the disposition on either side of the cylindrical stud or pivotal element 10, of a pair of replaceable bearing shoes or slipper bearing sections 25, one being placed between each of the flat surfaces of the flattened lug 21 and the adjacent cylindrical surface of the semi-cylindrical groove 4. The outer sides of the flattened lug 21 and the outer ends of the replaceable elongated bearing shoes 25 are contoured for flush arrangement with the periphery of the enlarged head 2 of the driving spindle 1.

Referring more particularly to Figure 5, it will be noted that the diameter of the cylindrical stud or pivotal element 10 is less than the width of the semi-cylindrical arbor 13. Between the square ends 30 of the cylindrical stud 10 and the bottom of the recess 5 and between the remote end walls of the latter and the flattened ends 11 of the said cylindrical stud there is provided a pair of substantially rectangular recesses at each end of the stud. For the purpose of occupying one of these recesses X, each of the replaceable elongated bearing shoes 25 has integrally formed on its inner end a lug 35 which extends upwardly beyond the curved surface 26 thereof and terminates in a curved upper extremity 37 which has intimate contact with the bottom of the recess 5. The lugs 35 may be relieved by a beveled portion as shown at 36.

While I have shown and described one specific embodiment of the present invention, it will be seen that I do not wish to be limited exactly thereto, since various modifications may be made without departing from the scope of the invention as defined in the appended claims.

I claim:

1. A universal coupling comprising a driving member and a driven member, one of said members being provided with a bifurcated extension, the other of said members having a transverse slot to receive said bifurcated extension, said transverse slot providing cylindrical bearing surfaces in the opposite side walls thereof, a right-angular pivot pin disposed at the approximate mid-portion of said transverse slot and adapted for transaxial rotative movement therein, correspondingly opposite sides of the ends of said pivot pin being flattened, and a bearing shoe extending from each of the flattened surfaces of said pivot pin to adjacent the corresponding ends of said transverse slot, one side of each of said bearing shoes being adapted to contact a cylindrical bearing surface of said transverse slot, the other side of each of said bearing shoes being adapted to contact one of the surfaces of the bifurcated extension aforesaid.

2. A universal coupling comprising a driving member and a driven member, one of said members being provided with a bifurcated extension, correspondingly opposite sides of each of the bifurcations being flattened, the other of said members having a transverse slot to receive said bifurcated extension, said transverse slot providing cylindrical bearing surfaces in the opposite side walls thereof, a right-angular pivot pin disposed at the approximate mid-portion of said transverse slot and adapted for transaxial rotative movement therein, correspondingly opposite sides of the ends of said pivot pin being flattened, and a bearing shoe extending from each of the flattened surfaces of said pivot pin to adjacent the corresponding ends of said transverse slot, one side of each of said bearing shoes being adapted to contact a cylindrical bearing surface of said transverse slot, the other side of each of said bearing shoes being adapted to contact one of the flattened surfaces of the bifurcated extension aforesaid.

3. A universal coupling comprising a driving member and a driven member, one of said members being provided with a bifurcated extension, the other of said members having a transverse slot to receive said bifurcated extension, said transverse slot providing cylindrical bearing surfaces in the opposite side walls thereof, the approximate mid-portion of said transverse slot having a circumferential groove, a pivot pin disposed in said circumferential groove and adapted for transaxial rotative movement with respect to said transverse groove, correspondingly opposite sides of the ends of said pivot pin being flattened, and a bearing shoe extending from each of the flattened surfaces of said pivot pin to adjacent the corresponding ends of said transverse slot, one side of each of said bearing shoes being adapted to contact a cylindrical bearing surface of said transverse slot, the other side of each of said bearing shoes being adapted to contact one of the surfaces of the bifurcated extension aforesaid.

4. A universal coupling comprising a driving member and a driven member, one of said members being provided with a bifurcated extension, correspondingly opposite sides of each of the bifurcations being flattened, the other of said members having a transverse slot to receive said bifurcated extension, said transverse slot providing cylindrical bearing surfaces in the opposite side walls thereof, the approximate midportion of said transverse slot having a circumferential groove, a pivot pin disposed in said circumferential groove and adapted for transaxial rotative movement with respect to said transverse groove, correspondingly opposite sides of the ends of said pivot pin being flattened, and a bearing shoe extending from each of the flattened surfaces of said pivot pin to adjacent the corresponding ends of said transverse slot, one side of each of said bearing shoes being adapted to contact a cylindrical bearing surface of said transverse slot, the other side of each of said bearing shoes being adapted to contact one of the flattened surfaces of the bifurcated extension aforesaid.

5. A slipper bearing section comprising a substantially rectangular body having side and end edges and oppositely disposed bearing faces, one of said bearing faces being substantially flat and being extended to said side and end edges and the other of said bearing faces extending between said side edges and being arcuately convex transversely of said side edges, one of said end edges being disposed in a plane substantially normal to said substantially flat bearing face, said body having a positioning lug at one end thereof projecting from said arcuate bearing face and extending substantially to the side edges of said body, said positioning lug having one end face thereof disposed substantially in the plane of said end edge of said body that is substantially normal to said substantially flat bearing face, the opposite face of said lug being substantially parallel to said end of said body and being spaced therefrom and merged into said convex bearing face.

6. In a pivot pin assembly for use in universal couplings, an elongated pin that is substantially circular in cross section in the medial portion thereof and which has end sections at opposite ends of said medial portion, each of said end sections including substantially flat opposite faces respectively disposed in substantially parallel planes, and a back-up member having an arcuate outer bearing surface extended between corresponding end edges of said end sections and in spaced relation with the medial part of said pin.

7. In a pivot pin assembly for use in universal couplings, an elongated pin that is substantially circular in cross section in the medial portion thereof and which has end sections at opposite ends of said medial portion, each of said end sections including substantially flat opposite faces respectively disposed in substantially parallel planes, said faces of said end sections being spaced one from the other in an amount substantially less than the diameter of the medial part of said pin, and a back-up member of a width greater than the diameter of said medial part of said pin and which has an arcuate outer bearing surface extended between corresponding end edges of said end sections and in spaced relation with the medial part of said pin.

8. In a pivot pin assembly for use in universal couplings, an elongated pin the outer surface of which is circular in cross sectional form and having relatively thin connecting webs extending in substantially the same plane from opposite ends thereof, and a generally arcuate back-up member extending between and connected at its opposite ends to corresponding end edges of said connecting webs, and said back-up member being constructed and arranged at each of its ends to afford shoulders on opposite sides of the respective web to which the end of the back-up member is connected.

9. In a pivot pin assembly for use in universal couplings, an elongated pin the outer surface of which is circular in cross sectional form and having relatively thin connecting webs extending in substantially the same plane from opposite ends thereof, and a generally arcuate back-up member extending between and connected at its opposite ends to corresponding end edges of said connecting webs, and said back-up member being constructed and arranged at each of its ends to afford shoulders on opposite sides of the respective web to which the end of the back-up member is connected, and all of said shoulders being disposed in a common plane substantially parallel to the axis of said pin and substantially perpendicular to the opposite side faces of said webs.

EARL R. BACKUS.